M. L. PARRET.
OIL ADHESION TRANSMISSION DEVICE.
APPLICATION FILED JAN. 19, 1918.

1,302,701.

Patented May 6, 1919.

Witness.
A. L. Loucks.

Inventor.
Milton L. Parret
By Drury Bair,
Att'ys.

UNITED STATES PATENT OFFICE.

MILTON L. PARRET, OF MARSHALLTOWN, IOWA.

OIL-ADHESION TRANSMISSION DEVICE.

1,302,701.     Specification of Letters Patent.     Patented May 6, 1919.

Original application filed May 26, 1917, Serial No. 171,318. Divided and this application filed January 19, 1918. Serial No. 212,631.

*To all whom it may concern:*

Be it known that I, MILTON L. PARRET, a citizen of the United States, and resident of Marshalltown, in the county of Marshall and State of Iowa, have invented a certain new and useful Oil-Adhesion Transmission Device, of which the following is a specification.

The object of my invention is to provide an oil adhesion transmission device adapted for transmitting motion or power from one part of the mechanism to another part thereof by the use of disks having adjacent faces with oil between them.

Still a further object is to provide suitable means for adjusting the tension between the disks.

My improved transmission device may be used for a great variety of purposes and in a great variety of machines but is shown in connection with the moving picture projecting machine take up device.

With these and other objects in view my invention consists in the construction, arrangement and combination of the various parts of the device, whereby the objects contemplated are attained as hereinafter more fully set forth, pointed out in my claim, and illustrated in the accompanying drawings, in which:

My oil adhesion transmission device was shown in my application for patent on a moving picture projecting machine, filed May 26, 1917, Serial Number 171318 of which this is a continuation in part.

Figure 1:
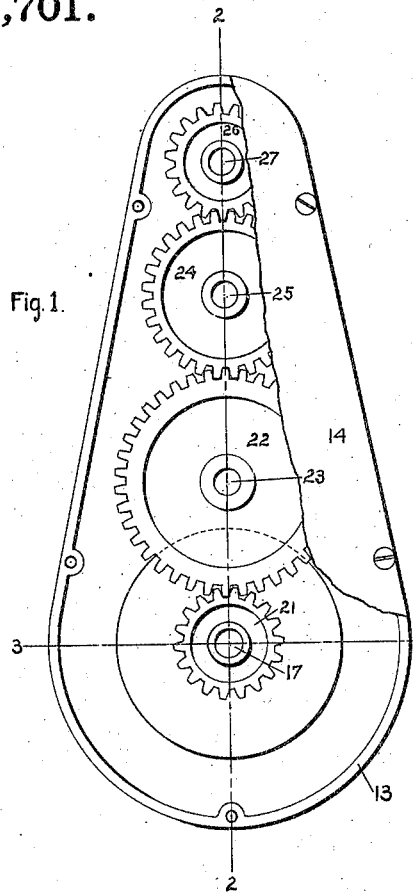
Figure 1 shows a side elevation of a device embodying my invention forming part of the take up mechanism of a moving picture machine.
Figure 2:
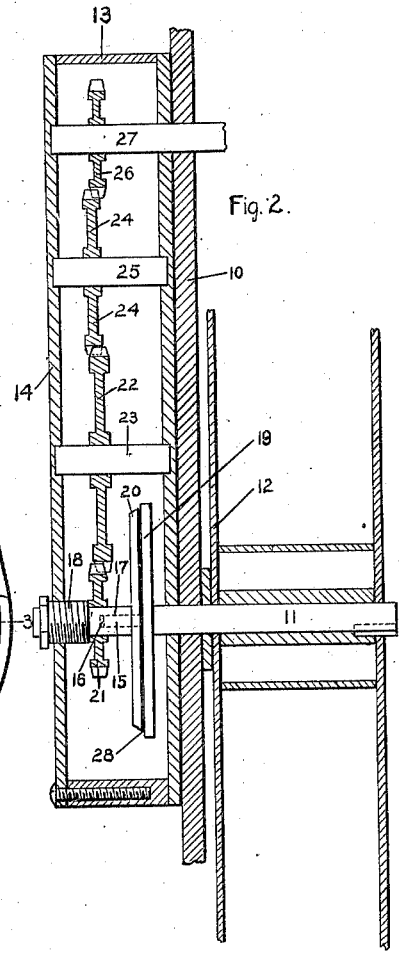
Fig. 2 shows a vertical sectional view taken on the line 2—2 of Fig. 1.
Figure 3:
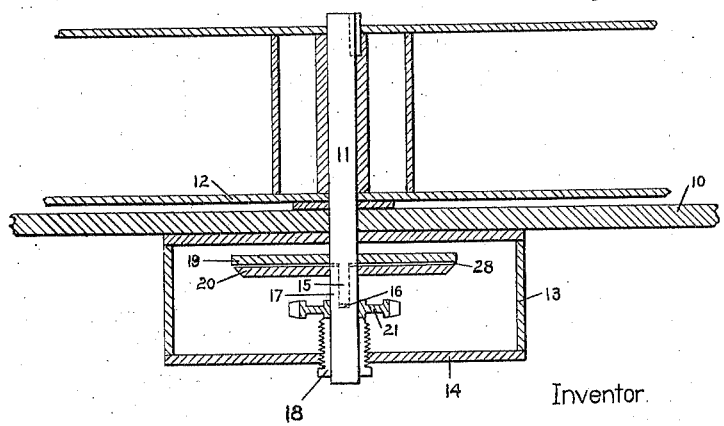
Fig. 3 shows a horizontal, sectional view taken on the line 3—3 of Fig. 1.

I have shown my improved device supported on a frame indicated in the drawings by the reference numeral 10. Mounted on the frame 10 is a shaft 11. On the shaft 11 is a reel or drum 12 adapted to support a moving picture film. Supported on the frame 10 is a casing 13 having a removable wall 14. The shaft 11 has a reduced end 15 shown by dotted lines in Fig. 2, which is slidably and rotatably received in a slot 16 in an alined shaft 17.

Mounted on the shaft 17 is an externally screw-threaded sleeve 18, which is mounted in a screw threaded opening in the wall 14 of the casing 13. Upon the shaft 11 is a disk 19. On one end of the shaft 17 is a similar disk 20 adjacent to the disk 19. The disk 20 has a central opening to admit the reduced portion 15 of the shaft 11. Fixed on the shaft 17 is a gear 21. The sleeve 18 has one end abutting against the gear 21. The gear 21 meshes with a gear 22 on a shaft 23 within the casing 13. The gear 22 meshes with a gear 24 on a shaft 25. The gear 24 meshes with a gear 26 on a shaft 27.

When the device is ready for use, oil 28 is placed between the disks 20 and 19 or the casing 13 may be partially filled with oil. When power is imparted to the shaft 27, it will be seen that rotation of the shaft 27 through the chain of gears hereinbefore described imparts rotation to the gear 21 and the shaft 17. The adhesion of the oil between the disks 20 and 19 will cause the disks to adhere together and result in the transmission of power to the shaft 11 and the reel 12 mounted thereon. At the same time there may be slippage, so that when the shaft 17 is rotated at a uniform rate of speed, the film may be wound on the reel 12. It is, of course, obvious that in order to wind up the film the reel 12 should travel faster at the beginning of the winding operation than at the latter part thereof and the slippage permitted by the use of a device of this kind makes it possible to impart constant tension on the film during all of the winding operation.

It will be seen that the use of the disks and adhesion power of oil affords a transmission device of very simple and inexpensive construction, which at the same time is highly efficient for the purposes desired. As hereinbefore suggested this device may be used for a great variety of purposes and as shown here applied to a moving picture machine only by way of suggestion.

I claim as my invention:

A transmission device for operating a film drum comprising a shaft having on one end a friction disk, a second alined shaft having on one end adjacent to said first disk a second friction disk, said shafts being telescopically connected, a supporting member, a sleeve adjustably mounted in said supporting member and receiving one end of said second shaft, whereby when said sleeve is adjusted, the shafts may be adjusted longitudinally with relation to each other for varying the relative positions of said disks.

Des Moines, Iowa, January 8, 1918.

MILTON L. PARRET.

Copies of this patent may be obtained for five cents each, by addressing the "Commissioner of Patents, Washington, D. C."